Figure 1A:

June 11, 1963 R. P. GUTTERMAN 3,093,806
PRESSURE TRANSDUCER

Filed Oct. 24, 1961 3 Sheets-Sheet 1

INVENTOR
ROBERT P. GUTTERMAN

BY Cushman, Darby + Cushman
ATTORNEY

June 11, 1963     R. P. GUTTERMAN     3,093,806
PRESSURE TRANSDUCER

Filed Oct. 24, 1961     3 Sheets-Sheet 2

INVENTOR
ROBERT P. GUTTERMAN

BY Cushman, Darby + Cushman
ATTORNEY

June 11, 1963 R. P. GUTTERMAN 3,093,806
PRESSURE TRANSDUCER

Filed Oct. 24, 1961 3 Sheets-Sheet 3

INVENTOR

ROBERT P. GUTTERMAN

BY
Cushman, Darby & Cushman
ATTORNEYS

United States Patent Office 3,093,806
Patented June 11, 1963

3,093,806
PRESSURE TRANSDUCER
Robert P. Gutterman, 9500 Forest Road,
Bethesda 14, Md.
Filed Oct. 24, 1961, Ser. No. 148,791
14 Claims. (Cl. 338—42)

This invention relates to devices for measuring mechanical forces, and is particularly directed to devices for measuring pressures. The device provided by this invention constitutes a micro-sized pressure transducer which has particular utility in the measurement of pressures occurring as a result of fluid flow over a surface, such as the pressures existing at the surface of an aircraft wing, ship's hull, or any analogous surface including those internally of a pipe or conduit means through which a fluid, either gaseous or liquid, is flowing. This device also has utility in a broader sense for measuring any pressures or forces developed either by static fluids or by forces directly applied by a mechanically impinging object, whether the pressures or forces are steady or rapidly fluctuating in character.

There are many devices and gauges for measuring pressure which are known to the art; however, there exists today a need for devices responsive to and capable of measuring pressures, i.e. forces, existing over a surface, particularly where a more or less steep pressure gradient may exist over the surface, which devices must have at most a minimal effect on the actual surface contour itself. This problem exists, for instance, in the fields of aerodynamics and hydrodynamics where it is important for basic research and design work to accurately establish pressure gradients over an air-foil or hydro-foil. In addition, much the same problems exist with the current work in the development of jet and rocket engine or nozzle designs where similar pressure gradients exist over a surface exposed to a rapid flow of a fluid.

While some devices and systems have been developed for measuring the varying pressures on such surfaces, generally these contemplate an arrangement wherein the pressure responsive element is embedded in a specially constructed air-foil, or the like, simulating the actual air-foil to be used in practice. There are obvious disadvantages in such special constructions. For instance, aside from the additional expense involved, it is difficult to maintain the true mechanical characteristics of the actual air-foil to be used. This problem becomes increasingly severe as the air-foil or the like becomes increasingly thin.

These pressure measuring problems can be immensely facilitated if a pressure-responsive device or a pressure transducer is provided which is of such dimension that it can be attached to the surface of the air-foil, without other modification thereof, and when so attached will have a minimal effect on the air flow characteristics of the air-foil, or the like.

It is, therefore, an object of this invention to provide such a pressure transducer.

More specifically, it is an object of this invention to provide a transducer for measuring pressure changes which comprises: at least two electrical resistance means, means at least partially spacing these plates from each other, at least one of said plate means being resiliently flexible to move into contact with the other of said plate means and responsive to increased pressure thereon so as to increase the area of contact between said plate means, the electrical resistance between said plate means varying as the area of contact therebetween varies.

Various means for achieving this objective will be specifically illustrated in the following discussion and description of this invention, which will, in turn, reveal additional objects of this invention.

Figure 3:
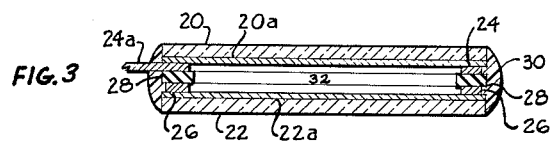
Figure 4:
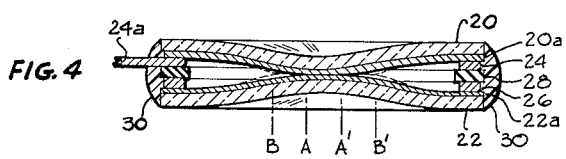
Figure 5:
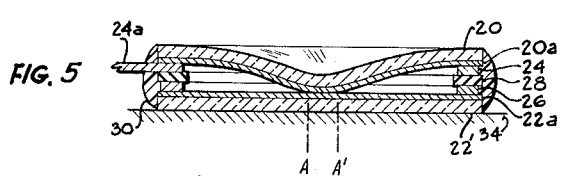
Figure 6:
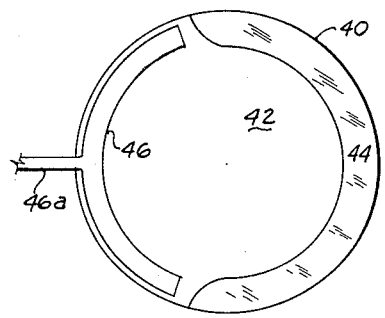
Figure 7:
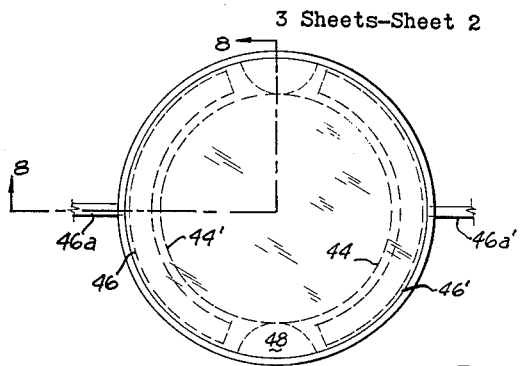
Figure 8:
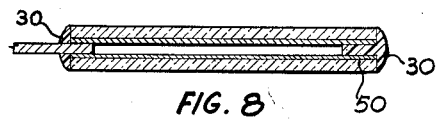
Figure 9:
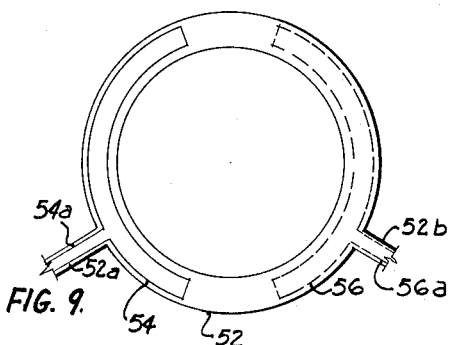
Figure 10:
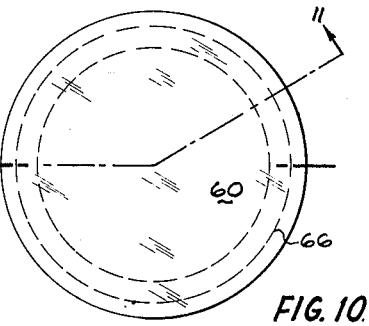
Figure 11:
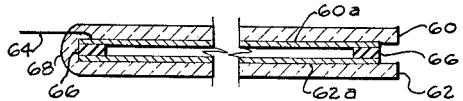
Figure 12:
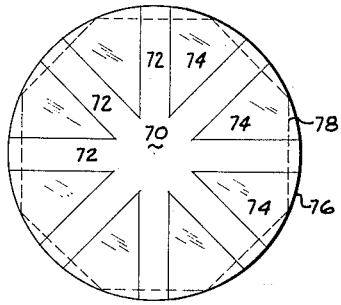
Figure 13:
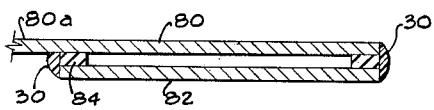
Figure 14:
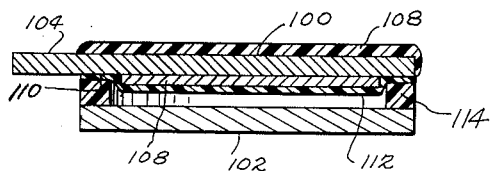
Figure 15:
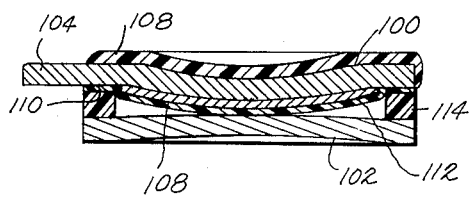
Figure 16:
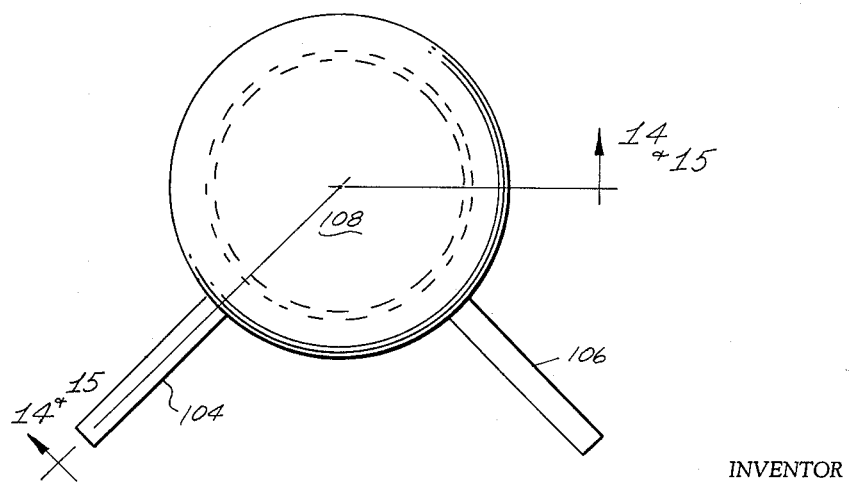

In the attached drawings:
FIGURES 1a through 1e show in exploded perspective view the component parts of a basic design of the pressure transducer provided by this invention;
FIGURE 2 is a plan view of the assembled transducer constructed from the elements illustrated in FIGURES 1a–1e;
FIGURE 3 is a cross-sectional view of the transducer shown in FIGURE 2, taken along the lines 3—3;
FIGURE 4 is a cross-sectional view of the transducer shown in FIGURES 2 and 3, under response to a pressure or force applied thereto;
FIGURE 5 is a cross-sectional view similar to FIGURE 4 but relating to a modification of the transducer design shown in FIGURES 2, 3, and 4;
FIGURE 6 illustrates, in plan view, the component part of another design for a pressure transducer;
FIGURE 7 is a plan view of the assembled transducer using the component element shown in FIGURE 6;
FIGURE 8 is a cross-sectional view of the transducer of FIGURE 7, taken along the lines 8—8;
FIGURE 9 is the plan view of another component for use in a further embodiment of this invention;
FIGURE 10 is a plan view of the assembled transducer using the component of FIGURE 9;
FIGURE 11 is a cross-sectional view of the transducer of FIGURE 10, taken along the lines 11—11;
FIGURE 12 is a plan view illustrating still further variations in a component of the transducer;
FIGURE 13 is a cross-sectional view of yet another transducer embodiment of this invention;
FIGURE 14 is a cross-sectional view of a still further embodiment of the transducer of this invention;
FIGURE 15 is a cross-sectional view of the transducer of FIGURE 14, under response to a pressure or force applied thereto; and
FIGURE 16 is a plan view of the transducer of FIGURES 14 and 15.

Referring first to the pressure transducer illustrated in FIGURES 1–5, it will be seen that the transducer is composed of two plate members 20 and 22 which have metallic film coatings on one side thereof, 20a and 22a, respectively. As shown, a preferred construction material for plates 20 and 22 is glass or quartz, although as will be discussed hereinafter, other materials may also be employed. The film coating 20a or 22a thereof is, conveniently, a vacuum-deposited film of a conductive metal, for instance, aluminum, copper, silver, platinum, rhodium, etc. This film may also be applied by decomposition of a gold salt to provide a gold film. This film is a presently preferred embodiment because of the cheapness of the metal and its chemical and mechanical stability. The thickness of this film has been greatly exaggerated for purposes of illustration, as have other relative dimensions of the transducer components.

Figure 1B:
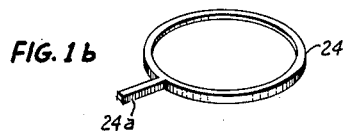
Figure 1C:
Figure 1D:
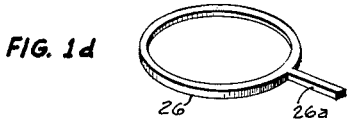
Figure 1E:
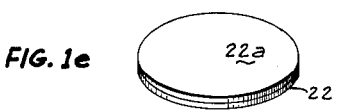
Figure 2:
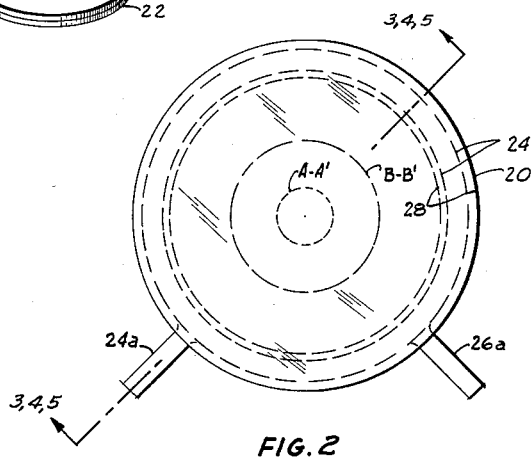

FIGURES 1b and 1d illustrate annular electrode elements 24 and 26 respectively carrying leads 24a and 26a. FIGURE 1c illustrates an annular insulating ring 28 which may be formed of any suitable material such as various synthetic polymers having insulating characteristics or of vitreous insulators such as glass or quartz.

When the component elements of FIGURES 1a–1e are assembled as shown in the transducer of FIGURES 2 and 3 and a binding seal 30 is applied to the rim of the assembled wafer, the transducer is complete and ready for attachment to suitable electrical apparatus of conventional character which will record and/or be responsive to changes in the electrical resistance between electrodes 24 and 26. As can be seen from these figures, annular electrode element 24 is in contact with metallic film 20a on plate 20, and, in turn, electrode 26 is in contact with metallic film 22a on plate 22. These two electrodes, and therefore plate members 20 and 22, are insulated from each other by ring 28. Accordingly, in the state shown in FIGURE 3, there is for all practical purposes an infinite resistance between electrodes 24 and 26. This is especially true because it is desired to assemble the transducer elements under high vacuum, and the annular seal 30 hermetically isolates the internal space 32 from the surrounding environmental atmosphere of the transducer wafer.

However, when an external force or pressure is applied to plates 20 and 22, these plates are resiliently flexed inwardly and establish contact with each other in the region A—A'. When this contact is established, the resistance measurement between electrodes 24 and 26 is markedly reduced because of conductive layers 20a and 22a on plates 20 and 22, respectively. The resulting change in electrical resistance can be measured by conventional electrical equipment. It is in fact a particular feature of this invention that the resistance changes established by changes in the area of contact between plates 20 and 22, or more specifically metallic films 20a and 22a, are of such magnitude that they may be measured by conventional ohmmeters without amplification of the signal.

It is apparent that, if the external pressure or force applied to plates 20 and 22 increases, the area of contact between films 20a and 22a will also increase, for instance, to area B—B' (see FIGURES 2 and 4), and, accordingly, the resistance between electrodes 24 and 26 will be still less. With suitable initial calibration, the pressure changes can be directly "read" from these changes in resistance.

FIGURE 5 illustrates a variation of the transducer shown in FIGURES 2, 3, and 4, wherein plate member 22 has been fabricated of a non-elastic material or has been cemented to a non-elastic base 34. Thus, in this transducer only one plate member flexes inwardly in response to an external pressure, but otherwise the behavior and utility of the transducer is substantially the same as described for that shown in FIGURES 2 and 3. Again, a contact A—A' is established and will decrease the initially infinite resistance between electrodes in conductive contact with plate 22 and the metallic film 20a on plate 20. As a specific illustration of this modification of the invention, plate 22' in the transducer of FIGURE 5 may be constructed of a relatively thick metallic material and, consequently, need have no metallic film coating such as 22a, applied to the internal surface thereof.

This invention thus provides a pressure transducer exhibiting unusually large electrical resistance changes in response to pressure changes, and which can at the same time be constructed relatively simply and easily of materials and of a dimension which places the device in the field of miniaturized devices.

By way of illustration of this last point, plate members 20 and 22 may be fabricated of glass having a thickness of as little as 2 mils; metallic films 20a and 22a will be of molecular thickness, i.e., a few microns; electrodes 24 and 26 may be made of any suitable conductive metal, for instance, gold foil and of a thickness of, for instance as little as 0.5 mil; and insulating ring 28 whether fabricated of glass, plastic, quartz, or the like, may have a thickness of as little as 0.5 mil. Thus, the overall thickness of the assembled transducer of FIGURES 1–5 can readily be made as little as 5.5 mils. At the same time, the overall diameter of the transducer can easily be less than 1 inch, and as small as 250 mils or even smaller with refined manufacturing techniques. Taking into consideration the modulus of elasticity of the materials from which plate members 20 and 22 are constructed, and the effect thereof on the pressure-induced deflection of such plates, the ratio between the diameter of the plates to the width of the space 32 between them, should be at least 10:1, preferably at least 100:1. The transducers of the design of FIGURES 1–5 do not, however, indicate the minimum dimensions which can be achieved.

For instance, FIGURES 6, 7, and 8 illustrate a further embodiment of the transducer of the invention. FIGURE 6 shows in plan view a plate member 40 having a metallic film coating applied over a portion of the surface 42, and also having a generally arcuate portion of its surface 44 uncoated. A suitably arcuate Y-shaped electrode 46 with lead 46a may then be used in conjunction with this plate member as shown in the plan view of the assembled transducer, FIGURE 7, a pair of such electrodes are placed in opposed position and the two plate elements, as made according to the design shown in FIGURE 6 are sandwiched on either side of the two electrodes, 46 and 46', with their respective uncoated area, 44 and 44', also diametrically opposed to each other. A "three-ply" transducer wafer then results, as can be seen from the cross-section view of FIGURE 8, with the space 48, seen in FIGURE 7, between the ends of the respective electrodes filled with a suitable insulating filler material, as at 50 in FIGURE 8, and with hermetic annular seal 30 applied to the rim of the wafer in the manner described with reference to FIGURE 3. The thickness of this transducer, using elements having comparable dimensions, may be as little as 70% of the thickness of the transducer of FIGURES 1–4.

As an alternative to the design of FIGURES 6, 7, and 8, the transducer may be fabricated using the component shown in FIGURE 9. This component is an annular insulating ring 52 with electrode circuit elements 54 and 56 printed on either side thereof, by conventional printed circuit techniques. They are shown in generally diametrically opposed positions, but this is not necessary. Conveniently, the ring 52, made out of a suitable plastic such as a polyester resin, can include tab portions 52a and 52b, on which are printed the respective electrode leads 54a and 56a. This ring may then be used with metallic film-coated glass plate elements, such as those shown in FIGURES 1a and 1e, to form an assembled transducer having a cross-section analogous to that illustrated at FIGURE 3. However, since the printed circuit technique has been used, this embodiment will also be essentially a three-ply structure, having a thickness comparable to that shown in FIGURES 6, 7, and 8.

Still a further embodiment of the invention is shown in plan and cross-section views of FIGURES 10 and 11, respectively. This transducer comprises two plate members 60 and 62 having metallic film coatings 60a and 62a. The electrode elements 64 here constitute a suitable terminal element fused in the glass disk and in contact with the metallic film coatings 60a or 62a. In the assembled unit, an insulating ring 66 spaces the two disks apart, and, as before, the rim is then sealed.

This embodiment also illustrates an alternative sealing technique. Thus, the transducer assembly before sealing is shown in FIGURE 11 to the right of the break lines, with glass plate elements, 60 and 62, extending beyond the periphery of the insulating ring 66. By fusion of these extended portions a glass rim seal can be achieved for the completed assembly, as shown at 68, in FIGURE 11, to the left of the break lines. This fused glass rim technique can, of course, also be used with the other embodiments of the invention in place of the sealing element 30 of, for instance, FIGURES 3 and 8. It is preferably employed with an insulating ring made of the same vitreous material as the plate, generally glass or quartz.

It will of course be appreciated that this invention is not limited to transducers having the rim seal as described. To the contrary, especially in instances where the transducer is responsive to a mechanically applied force, as by impingement of a rod mounted on, for instance, piston means responsive to pressure changes in a remote system, it is only necessary that the respective plate members, electrode elements and insulating means be secured in appropriate register, i.e. corresponding to the cross-section to the right of the break lines in FIGURE 11. An analogous arrangement may be used with assemblies of any of the other illustrated components as well.

It has already been mentioned that the response of the transducer, provided by this invention, is quite large. It is also generally very nearly linear. This may initially be thought somewhat surprising since the decrease in resistance which is observed when the contact area increases from A—A' to B—B' (referring to FIGURES 2 and 4) varies as the square of the radius of the contact area. While this suggests a non-linear response, this factor is generally, and sometimes almost exactly, compensated for as the contact area increases by the increased resistance to further flexing by the material of which the plate element is fabricated. Thus, each successive increment in diameter of the contact area requires successively larger increments in the applied pressure to apply adequate stress over the relatively small non-contact region of the plate structure under condition B—B' as opposed to condition A—A'.

The range of pressure response of transducers made according to the present invention can easily be varied if desired by, when permissible, varying the thickness of the plate elements, or by, when permissible, varying the spacing therebetween or, if dimensions must be held as small as possible, by varying the internal pressure of the wafer prior to applying the annular seal 30. In addition, use may be made of varying materials having varying modulae of elasticity to achieve similarly different response ranges.

It is not necessary to the above-described embodiment, that the plate elements be fully conductive over their entire inner surface. Thus, in addition to such variations as illustrated in FIGURE 6, the conductive area may have any desired pattern, such as that shown at 70 in FIGURE 12 wherein a series of radial metallic film strips 72 extend to the circumference of the plate, leaving glass areas 74 uncoated. Various other patterns may, of course, be used, especially where it may be desired to change the resistance response to pressure change from a substantially linear to some other function.

A further embodiment of the transducer of this invention is shown in FIGURES 14, 15, and 16 of the drawing. In this embodiment, two substantially identical metal elements 100 and 102 form the opposed deflectable plates of the transducer construction. These may be of a thickness of, for instance, about 0.5 mil, or as much as about 4 or 5 mils, conveniently about 1 or 2 mils.

Each of the metal elements 100, 102 has a "tail" or lead, 104, 106, integral with the plate or "pan" portion thereof, and providing means for making electrical contact with suitable recording apparatus.

Advantageously, these elements are formed from a beryllium-copper alloy containing about 2% beryllium. This particular metal combination can be advantageously heat-tempered to give the desired deflecting characteristics suitable for best operation, and the preparation of these metal elements is important to the best performance of this embodiment of the transducer.

Element 100 as shown in FIGURE 14, is first immersed in a sodium silicate solution. Typically, this is a solution of about 10% sodium silicate to which a small amount of a readily vaporized alcohol, such as ethyl or isopropyl alcohol has been added. This solution then is further diluted with water to about $\frac{1}{25}$ of that concentration. This solution is then evaporated at ambient temperatures leaving a thin gray film of the deposited silicate. This film or coating is relatively fragile at this point and is merely physically deposited on the metal element.

The thus-coated element 100 is next placed between a pair of optical flat quartz plates, and heated to a temperature between about 600 and 650° F., for a period of about 1 to 2 hours. As a result of this heat treatment, the gray sodium silicate film is fused and apparently chemically reacted with the alloy, especially the beryllium component thereof, to form what appears to be a beryllium silicate complex. At this stage, the coating is substantially transparent and provides a bright shiny surface. This film coating 108 is almost ductile, and can hardly be removed, even by scratching. Even under severe and repeated flexing it is not flaked off the metal element.

As a result of this conditioning and reaction of the coating, which apparently fuses and intimately bonds the same into the metal, it provides a permanent and strong insulating and protective film about the metal element 100. The protective characteristics of this particular film are interesting in themselves, in that the beryllium-copper alloy is protected against the usual formation of an oxide layer, the metal remaining bright and shiny underneath the film, even though the film may be only $10-50 \times 10^{-6}$ inches thick. It is generally recognized that beryllium-copper alloys are difficult to temper by heat treatments without forming the undesirable oxide coating, and consequently the present method for forming the apparent beryllium silicate complex protective film, which is itself believed to be a novel process and product, is useful for purposes outside the scope of the present transducer invention. For instance, the oxide coating on beryllium-copper alloy elements as it is normally formed, is a fragile thin layer and is readily scraped or flaked off, and such elements will not maintain electrical response integrally if this surface is so changed by physical damage.

In the specific manufacture of a transducer element such as 100, after the silicate layer is deposited, a peripheral rim on the inner surface of the element, at regions 110 is scraped away so that the metal itself is exposed. After the heat treatment, an electrical resistive coating 112 is applied to the entire inner surface of the element. For instance, a graphite layer, or vacuum-deposited metal coating may be used. This resistive coating may be only about $\frac{1}{10,000}$ of an inch in thickness for suitable performance.

It will be seen that with resistive coating 112 applied, and in electrical contact with plate 100 at rim region 110, essentially the same electrical construction has been achieved as was formed by elements 20, 20A, and 24 shown in FIGURES 1A, 1B, and FIGURE 2.

The advantage of the present construction is, however, that the insulation coating 108 and the resistive coating 112 are of small thickness, and the plate element including all electrical structural characteristics thereof is essentially only as thick as plate 100.

The lower transducer plate element 102 is simply subjected to the same heat-tempering treatment given element 100, while clamped between the quartz optical flats. It need not be separately insulated, as plate 100, although this can be done if desired (with a vapor deposited conductive coating on the inner surface thereof). To form the transducer shown in FIGURES 14, 15, and 16, an uncoated metal plate 102 is employed and plates 100 and 102 are then assembled and hermetically sealed under vacuum with a Mylar ring spacer 114 therebetween shown. This Mylar ring may be of any thickness from about 0.25 to 15 mils, but generally 1 mil is found advantageous, and consequently a transducer of a total thickness of less than five mils may be readily produced with a minimum number of elements. It will be appreciated that these drawings are schematic and do not accurately reflect the relative dimensions of the component elements thereof.

This construction of FIGURES 14, 15, and 16 is especially rugged and its response characteristics have been shown to be substantially linear over a relatively wide range of pressures, with advantageously high orders of electrical response changes for pressure changes. This construction is the presently preferred embodiment of this invention.

Due to the variations in the effective peripheral bending moments, the character of the response can also be changed by using other shapes for the plate elements. That is, the invention is not limited to circular plates, although these are generally preferred. For instance, as indicated in FIGURE 12, instead of circular plate member 76, it is also within the scope of this invention to use an octagonal plate member 78, shown by the dotted lines. Of course, the greater the number of sides, the closer the response will conform to that of a circular plate. However, it is equally possible to use a triangular or rectangular plate element.

Furthermore, it is to be understood that this invention is not limited to a glass plate element having a metallic film coating thereon. In addition to the substitution of quartz for glass, with quartz actually being a preferred material, it is also within the scope of this invention to use plate members fabricated wholly of metal or other resilient conductive materials as shown in the cross-section of FIGURE 13. Here, plate members 80 and 82 are separated by an insulating spacer ring 84 and assembled with the usual ring seal 30. Each of plates 80 and 82 will carry an electrode lead as shown at 80a. Once, again, the application of external pressure will cause the metal plate members to flex inwardly into contact with each other, thereby establishing a current flow between the coated electrodes. In the very small transducer sizes which afford the most valuable uses of this invention, it will, of course, be recognized that the generally more flexible metal structure will frequently have a less desirable pressure response range; however, in some applications a metal foil plate member may be preferred, for instance, the measurement of subatmospheric pressures in evacuated systems.

It will be understood that it is also within the scope of this invention to employ plate members which are not planar, but which instead may have an initial, unstressed, concave configuration, corresponding to the construction shown in FIGURE 4 or FIGURE 5. In this instance, even though the external pressure and the internal pressures are the same, there is still electrical contact between the plates, and the transducer assembly remains responsive to changes in pressure by virtue of the resilient flexing of the plates to further increase (or decrease) the area of electrical contact, in the manner hereinbefore described. This last-mentioned embodiment of the plates, and the transducer, may also be used in the constructions shown in FIGURES 8, 11, 13, and 15, and may be formed, for instance, by proper tempering or stamping the metal plate in a dimpled or concave set. It is further within the scope of this invention to employ plates having a plurality of such dimples or concavities.

It will be understood that regardless of the initial configuration of the plates, planar or concave, the electrical resistance between such plates will be substantially infinite whenever they are not in electrical contact at a region such as A—A', as shown in FIGURE 2.

This application is a continuation-in-part of United States patent application, Serial No. 858,357, filed December 9, 1959, now abandoned.

While the foregoing description has involved reference to specific embodiments for purposes of clear illustration of the principles and concepts involved, it is apparent that the scope of this invention is not limited thereto but only by the spirit of the terms of the following claims.

I claim:

1. A transducer for measuring pressure changes which comprises: at least two plates, each having an electrical resistance characteristic invariable with pressure, means spacing and insulating said plates from each other solely at their periphery and forming a hermetically sealed solely gas-filled space between said plates, at least one of said plates being resiliently flexible in response to applied external pressure to place the same in direct electrical contact with the other of said plates, and further resiliently flexibly responsive to increased pressure thereon in excess of the pressure in said gas-filled space to increase the area of contact between said plates, the electrical resistance between said plates varying solely as the area of contact therebetween varies, and the ratio of the maximum planar dimension of the plates to the width dimension of the space between said plates is at least 10:1.

2. The transducer of claim 1, wherein said ratio of the maximum planar dimension of the plates to the width dimension of the space between said plates is at least 100:1.

3. A transducer for measuring pressure changes which comprises: at least two plates, each having an electrical resistance characteristic invariable with pressure, means spacing and insulating said plates from each other solely at their periphery and forming a hermetically sealed solely gas-filled space between said plates, at least one of said plates being resiliently flexible in response to applied external pressure to place the same in direct electrical contact with the other of said plates, and further resiliently flexibly responsive to increased pressure thereon to increase the area of contact between said plates, and the ratio of the maximum planar dimension to the width dimention of the space between said plate is at least 10:1, the electrical resistance between said plates varying solely as the area of contact therebetween varies and having an infinite value when the pressure in said gas-filled space is equal to the pressure external of the plates.

4. A transducer for measuring pressure changes which comprises: at least two plates, each having an electrical resistance characteristic invariable with applied voltage, means spacing and insulating said plates from each other solely at their periphery and forming a hermetically sealed solely gas-filled space between said plates, at least one of said plates being resiliently flexible in response to applied external pressure to place the same in direct electrical contact with the other of said plates, and further resiliently flexibly responsive to increased pressure thereon in excess of the pressure in said gas-filled space to increase the area of contact between said plates and the ratio of the maximum planar dimension to the width dimension of the space between said plates is at least 10:1, the electrical resistance between said plates varying solely as the area of contact therebetween varies and having an infinite value when the pressure in said gas-filled space is equal to the pressure external of the plates.

5. A transducer for measuring pressure changes which comprises: two vitreous plates, each having a surface with an electrical resistance characteristic invariable with pressure and voltage, said means spacing and insulating said plates from each other solely at their periphery and forming a hermetically sealed solely gas-filled space between said plates, two electrodes one in electrical contact with one of said surfaces and the other electrode in electrical contact with the other of said surfaces, said plates being resiliently inwardly flexible in response to applied external pressure to place said surfaces into direct contact with each other, and further resiliently flexibly responsive to increased pressure thereon to increase the area of contact between said surfaces, and the ratio of the maximum planar dimension to the width dimension of the space between said plates is at least 10:1, the electrical resistance between said electrodes varying solely as said area of contact varies and having an infinite value when the pressure in said gas-filled space is equal to the pressure external of the plates.

6. A transducer for measuring pressure changes which comprises: at least two vitreous plates, each having a surface bearing electrically conductive metal film, means spacing and insulating said plates from each other solely at their periphery and forming a hermetically sealed solely gas-filled space between said plates, said plates being resiliently flexible in response to applied external pressure to place said metal film-coated surfaces in direct electrical contact with each other, and further resiliently flexibly responsive to increased pressure thereon to increase the area of contact between said surfaces and the ratio of the maximum planar dimension to the width dimension of the space between said plates is at least 10:1, the electrical resistance between said plates varying solely as said area of contact varies and having an infinite value when the pressure in said gas-filled space is equal to the pressure external of the plates.

7. The transducer of claim 6, wherein said metal film covers the entire surface area of the plate.

8. The transducer of claim 6, wherein said metal film covers only a predetermined portion of said surface of said plate.

9. The transducer of claim 6, wherein said metal film is a vapor-deposited metal film.

10. A transducer for measuring pressure changes which comprises: at least two metal plates, each having an electrical resistance characteristic invariable with pressure, means spacing and insulating said plates from each other solely at their periphery and forming a hermetically spaced solely gas-filled space between said plates, at least one of said plates being resiliently flexible in response to applied external pressure to place the same in direct contact with the other of said plates, and further resiliently flexibly responsive to increased pressure thereon to increase the area of contact between said plates, and the ratio of the maximum planar dimension to the width dimension of the space between said plates is at least 10:1, the electrical resistance between said plates varying solely as the area of contact therebetween varies and having an infinite value when the pressure in said gas-filled space is equal to the pressure external of the plates.

11. A transducer for measuring pressure changes which comprises: two deflectable metal plates, an insulating coating on one of said plates, said insulating coating covering a portion, only of one side of said plate, an electrical resistance film on said partially coated side in electrical contact with the uncoated area of said surface; the other of said plates having an electrical resistance surface, means spacing and insulating said plates from each other solely at their periphery with said resistive surfaces opposing each other, and forming a hermetically sealed solely gas-filled space between said plates; said plates being resiliently flexible in response to applied external pressure to place said electrically resistance surfaces in direct electrical contact with each other, and further resiliently flexibly responsive to increased pressure thereon to increase the area of contact therebetween, the electrical resistance between said plates varying solely as said area of contact varies.

12. The transducer of claim 11 wherein said insulating coating is a baked silicate deposit and said metal is a beryllium copper alloy.

13. The transducer of claim 12 wherein each of said plates has a surface coated with said baked coating and said electrical resistance film.

14. The transducer of claim 12 wherein said electrical resistance film is a vacuum deposited metal film.

References Cited in the file of this patent

UNITED STATES PATENTS

| | | |
|---|---|---|
| 2,167,254 | Skellett | July 25, 1939 |
| 2,367,570 | Funaroff | Jan. 16, 1945 |
| 2,472,214 | Hurvitz | June 7, 1949 |
| 2,694,128 | Maurin | Nov. 9, 1954 |
| 2,752,558 | Kane | June 26, 1956 |

FOREIGN PATENTS

| | | |
|---|---|---|
| 2,177,677 | France | Dec. 1, 1958 |